(No Model.)

A. GÖHRING.
REFLECTOR.

No. 566,165. Patented Aug. 18, 1896.

Witnesses:
John Becker,
W. G. Whiting

Inventor:
Adolf Göhring
by his attorneys
Roeder & Briesen

UNITED STATES PATENT OFFICE.

ADOLPH GÖHRING, OF NEW YORK, N. Y.

REFLECTOR.

SPECIFICATION forming part of Letters Patent No. 566,165, dated August 18, 1896.

Application filed March 20, 1896. Serial No. 584,029. (No model.)

*To all whom it may concern:*

Be it known that I, ADOLPH GÖHRING, of New York city, New York, have invented an Improved Reflector, of which the following is a specification.

This invention relates to a hollow reflector of novel construction, and more particularly to the means for incasing the central heat-orifice and for preventing the heat from entering the hollow body of the reflector.

Figure 2:
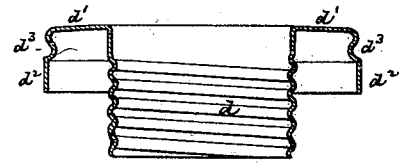
Figure 1:
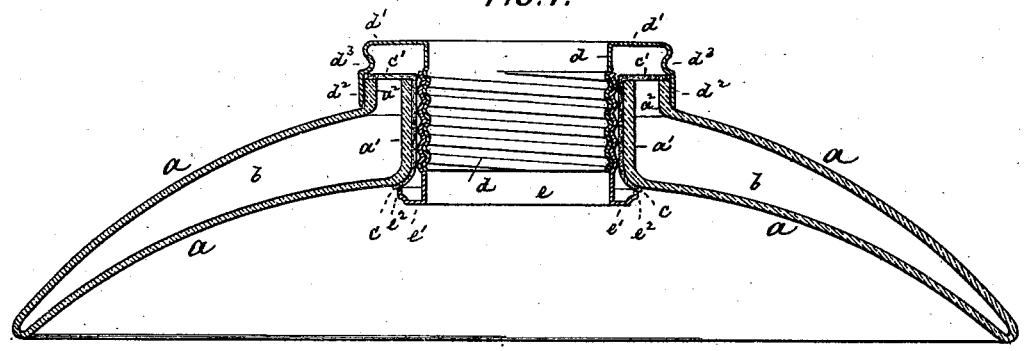
Figure 3:
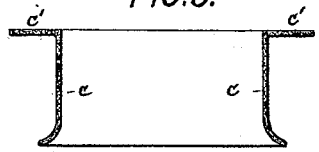
Figure 4:
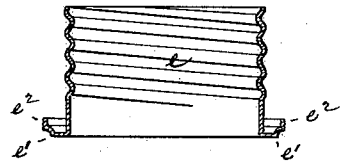

In the accompanying drawings, Figure 1 is a longitudinal central section of my improved reflector; Fig. 2, a longitudinal section through the upper sleeve $d$; Fig. 3, a longitudinal section through the packing $c$, and Fig. 4 a longitudinal section through the lower sleeve $e$.

The letter $a$ represents the body of a reflector, which is made of annular shape to form a central orifice designed for the escape of heat. The body of the reflector is hollow, being composed of an upper and a lower section, which diverge from the rim upward and terminate in a pair of vertical flanges $a'$ $a^2$. In this way an air-chamber $b$ is inclosed within the reflector in which the silver lining of the glass (out of which the body of the reflector is preferably formed) is contained. To prevent the air within this chamber from becoming heated and from thereby injuriously affecting the lining, the opening formed between the flanges $a'$ $a^2$ is closed by a nonconducting packing of asbestos or other suitable material. The packing $c$ is made in the form of a tube, Fig. 3, having a flange $c'$, that extends across the opening formed between the flanges $a'$ $a^2$. The main tubular body of the packing constitutes a lining for the central orifice of the reflector and thus protects the wall of this orifice against excessive heat.

In order to hold the packing in place and to form a central heat-conveying duct, I employ a pair of threaded sleeves $d$ $e$, that engage one another and fit snugly against the packing $c$. The upper sleeve $d$ is provided with a head $d'$, having a depending flange $d^2$, that surrounds the flange $a^2$. A bead $d^3$, formed on the head $d'$, above the flange $d^2$, presses the upper end of the packing $c$ $c'$ upon the edge of the flange $a^2$, and thus securely holds the flange $c'$ to its seat. Between the flange $c'$ of the packing and the head $d'$ an air-chamber is formed, which prevents the direct transmission of heat from the sleeve to the reflecting-body. The lower sleeve $e$ is provided with a head $e'$, having a flange $e^2$, that presses the lower end of the packing against the body of the reflector. In this way all the parts are properly assembled and protected against displacement.

By screwing the parts $d$ $e$ more or less apart the distance between their heads may be varied and thus the same sleeves may be readily fitted to reflectors of different sizes.

What I claim is—

The combination of a hollow annular reflecting-body having a pair of upwardly-extending flanges $a'$, $a^2$, and an opening between such flanges, with a flanged tubular packing, an upper threaded sleeve having a depending flange and a bead above such flange that presses the packing against its seat and forms an air-chamber above the same, and a lower threaded sleeve that engages the upper sleeve, substantially as specified.

ADOLPH GÖHRING.

Witnesses:
WILLIAM SCHULZ,
F. V. BRIESEN.